(12) United States Patent
Francois et al.

(10) Patent No.: US 12,031,932 B2
(45) Date of Patent: Jul. 9, 2024

(54) SYSTEM AND METHOD FOR MONITORING RESISTANCE OF A CONDUCTIVE COATING AS AN INDICATOR OF A CONDITION OF THE CONDUCTIVE COATING

(71) Applicant: PPG Industries Ohio, Inc., Cleveland, OH (US)

(72) Inventors: Emmanuel C. Francois, Madison, AL (US); Stephen J. Molmer, Huntsville, AL (US); Khushroo H. Lakdawala, Santa Clarita, CA (US); Nicolas B. Duarte, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 599 days.

(21) Appl. No.: 17/273,800

(22) PCT Filed: Aug. 27, 2019

(86) PCT No.: PCT/IB2019/057173
§ 371 (c)(1),
(2) Date: Mar. 5, 2021

(87) PCT Pub. No.: WO2020/049405
PCT Pub. Date: Mar. 12, 2020

(65) Prior Publication Data
US 2021/0190715 A1  Jun. 24, 2021

Related U.S. Application Data

(60) Provisional application No. 62/727,229, filed on Sep. 5, 2018.

(51) Int. Cl.
*G01N 27/20* (2006.01)
*B64D 15/12* (2006.01)
(Continued)

(52) U.S. Cl.
CPC .............. *G01N 27/20* (2013.01); *B64D 15/12* (2013.01); *B64F 5/60* (2017.01); *G01N 27/041* (2013.01);
(Continued)

(58) Field of Classification Search
CPC ........ B32B 17/10036; B32B 17/10174; B32B 2605/18; B32B 2255/205
See application file for complete search history.

(56) References Cited

U.S. PATENT DOCUMENTS 6,535,126 B2  3/2003  Lin et al.
10,063,047 B2  8/2018  Duarte et al.
(Continued)

FOREIGN PATENT DOCUMENTS

CN  1728012 A  2/2006
CN  104507796 A  4/2015
(Continued)

*Primary Examiner* — Jermele M Hollington
*Assistant Examiner* — Temilade S Rhodes-Vivour (57) ABSTRACT

A system for monitoring a condition of an article including a conductive coating includes: a measurement device electrically connectable to the conductive coating of the article configured to sense an electrical property of the conductive coating; and a processor electrically connected to the measurement device. The processor is configured to: receive the sensed electrical property of the conductive coating from the measurement device; determine a resistance of the conductive coating based on the received sensed electrical property; determine an estimated remaining usable life of the article based on the determined resistance of the conductive coating; and generate an output signal representative of the determined estimated remaining usable life.

19 Claims, 6 Drawing Sheets

(51) Int. Cl.
    *B64F 5/60*     (2017.01)
    *G01N 27/04*     (2006.01)
    *H05B 1/02*     (2006.01)
    *H05B 3/84*     (2006.01)

(52) U.S. Cl.
    CPC ............ *H05B 1/0236* (2013.01); *H05B 3/84* (2013.01); *H05B 2203/013* (2013.01)

(56) References Cited

U.S. PATENT DOCUMENTS

| | | | |
|---|---|---|---|
| 2006/0024072 A1 | 2/2006 | Kuroki et al. | |
| 2008/0190912 A1* | 8/2008 | Yeung | H05B 3/26 219/443.1 |
| 2009/0104364 A1* | 4/2009 | Millero, Jr. | C09D 5/084 524/556 |
| 2010/0163675 A1* | 7/2010 | Rashid | B64C 1/1484 73/75 |
| 2013/0075531 A1* | 3/2013 | Jiao | H02H 9/02 361/42 |
| 2017/0030861 A1* | 2/2017 | Jiao | B64C 1/1484 |

FOREIGN PATENT DOCUMENTS

| | | |
|---|---|---|
| CN | 105895619 A | 8/2016 |
| CN | 107223364 A | 9/2017 |
| EP | 1648200 A1 | 4/2006 |
| EP | 2879951 A2 | 6/2015 |
| JP | 2000347726 A | 12/2000 |
| JP | 2000347746 A | 12/2000 |
| JP | 2015530303 A | 10/2015 |
| WO | 2016133612 A1 | 8/2016 |

\* cited by examiner

SYSTEM AND METHOD FOR MONITORING RESISTANCE OF A CONDUCTIVE COATING AS AN INDICATOR OF A CONDITION OF THE CONDUCTIVE COATING

FIELD OF THE INVENTION

This disclosure relates to systems and methods for monitoring a condition of an article comprising a conductive coating based on a resistance of the conductive coating.

BACKGROUND OF THE INVENTION

Aircraft windshields and passenger windows include defogging/deicing systems for heating surfaces of the windshield and windows to remove moisture and to improve visibility. Such defogging/deicing systems can include transparent or semi-transparent conductive and resistive coatings or films electrically connected to a heater controller and/or power supply and configured to produce heat when electric current passes through the coating or film.

A variety of different materials are known for producing such transparent conductive coatings, which can be used with window heating systems. Some windows include a thin film of a conductive metal oxide, such as indium tin oxide (ITO). ITO may be formed on a substrate by sputtering from a target. The target can be stationary relative to the substrate during the sputtering or can move across a surface of the substrate according to a predetermined pattern.

In order to apply power to a conductive (e.g., ITO) coating, the coating can be electrically connected to the power supply through a heating arrangement including bus bars and wire leads. The power supply can be a DC power supply or an AC power supply. Following prolonged use (e.g., prolonged exposure to the electric current) or due to damage, such as damage caused by impacts with the coating or window, the conductive coatings can deteriorate or degrade. The window should be repaired or replaced once the coating deteriorates or degrades beyond acceptable limits. Continued use of a window with a degraded coating can cause the coating or window to crack or break, which can cause an emergency situation.

SUMMARY OF THE INVENTION

The invention can include a system for monitoring a condition of an article including a conductive coating. The system can include: a measurement device electrically connectable to the conductive coating of the article configured to sense an electrical property of the conductive coating; and a processor electrically connected to the measurement device. The processor is configured to: receive the sensed electrical property of the conductive coating from the measurement device; determine a resistance of the conductive coating based on the received sensed electrical property; determine an estimated remaining usable life of the article based on the determined resistance of the conductive coating; and generate an output signal representative of the determined estimated remaining usable life.

The invention can also include a windshield heating system for a vehicle. The system can include: a transparency; a conductive coating on a portion of the transparency configured to generate heat when an electric current is applied to the conductive coating; a power supply connected to the conductive coating configured to generate the electric current that heats the conductive coating; a measurement device electrically connectable to the conductive coating configured to sense an electrical property of the conductive coating when the electric current is applied to the conductive coating; and a processor electrically connected to the power supply and to the measurement device. The processor is configured to: cause the power supply to apply the electric current from the power supply to the conductive coating; receive the sensed electrical property of the conductive coating from the measurement device; determine a resistance of the conductive coating based on the sensed electrical property; and generate a signal to disconnect the power supply from the conductive coating based on the determined resistance of the conductive coating.

The invention can also include a method of monitoring a condition of a transparency. The method includes: sensing an electrical property of a conductive coating of the transparency with a measurement device; determining, with a processor, a resistance of the conductive coating based on the sensed electrical property sensed by the measurement device; and determining, with a processor, an estimated remaining usable life of the transparency based on the determined resistance.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limit of the invention.

Further features and other examples and advantages will become apparent from the following detailed description made with reference to the drawings in which.

DETAILED DESCRIPTION OF THE INVENTION

As used herein, the terms "right", "left", "top", "bottom", and derivatives thereof shall relate to the invention as it is oriented in the drawing figures. However, for purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges included therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

In addition, in this application, the use of "or" means "and/or" unless specifically stated otherwise, even though "and/or" may be explicitly used in certain instances. In this application, the use of the singular includes the plural and plural encompasses singular, unless specifically stated otherwise. Further, as used herein, the singular form of "a", "an", and "the" include plural referents unless the context clearly dictates otherwise. For example, although the invention is described herein in terms of "a" conductive coating, "a" processor, or "a" measuring device, one or more of any of these components or any other components recited herein can be used within the scope of the present disclosure.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that can be wired and/or wireless in nature. Additionally, two units or components can be in communication with each other even though the data transmitted can be modified, processed, routed, and the like, between the first and second unit or component. For example, a first unit can be in communication with a second unit even though the first unit passively receives data, and does not actively transmit data to the second unit. As another example, a first unit can be in communication with a second unit if an intermediary unit processes data from one unit and transmits processed data to the second unit. It will be appreciated that numerous other arrangements are also possible.

With reference to the figures, the present disclosure is generally directed to a system 200 (shown in FIG. 4) for monitoring a condition of an article including a conductive coating 30. As used herein, a "conductive coating" can refer to a material having the ability to conduct electric current. The "conductive coating" can include conductive layers, films, membranes, and other surfaces applied to and/or positioned between portions of the article. The article can be a transparency, such as a window or windshield of a vehicle, such as an aircraft, land vehicle, or water vessel. Transparencies are generally transparent or translucent articles having a visible light transmittance sufficient to allow an individual to view objects through the transparency. Transparencies can have a visual light transmittance of at least 10%. The article may also include other types of substrates, panels, sheets, walls, and surfaces.

In the following discussion, the article is described as an aircraft transparency, such as an aircraft windshield or window. However, the system 200 of the present disclosure can be used with any of the articles previously described or other not listed here. The conductive coating 30 of the aircraft transparency can be a heater film configured to increase in temperature when an electric current is applied to the coating 30. The conductive coating 30 can be used in window heating arrangements or systems 100 configured to prevent moisture, fog, and/or ice from accumulating on a surface of the transparency. The systems 200 disclosed herein can also be used to monitor a condition of a heat mat or similar device including resistive wires positioned in a packaging for heating a surface. In such cases, the system 200 can be configured to monitor changes in resistance of electric current passing through the resistive wires over time. The conductive coating 30 can also be another type of conductive layer of the transparency, such as a static reducing or p-static layer. A p-static layer can have anti-static and/or static-dissipative properties and can be configured to drain or dissipate static charges that collect in the transparency during operation of the aircraft, particularly during landing.

The systems 200 disclosed herein monitor changes to the conductive coating 30, such as changes caused by deterioration of the conductive coating 30 due to prolonged use, exposure to environmental elements, and/or from damage caused by sudden events, such as a sudden impact with an object, thermal shock, and/or sudden changes in temperature and/or pressure around the transparency. The disclosed systems 200 and methods can track changes in a resistance of the conductive coating 30 over time. Such changes in resistance have been determined to indicate deterioration of the coating 30 and approaching or imminent failure of the coating 30. While not intending to be bound by theory, it is believed that during normal use, resistance of the conductive coating 30 gradually increases over time substantially linearly due to gradual degradation of the coating structure, and/or degradation of surrounding coatings, bus bars, and/or other intimate electrical connections of the article. As used herein, "substantially linearly" refers to a gradual increase in resistance of the conductive coating 30 having a regression coefficient (R) of 0.9 or higher over a period of time of 5 hours or longer during normal operation of the coating 30. Such gradual degradation impedes or restricts a flow of electric current through the coating 30 causing the increasing resistance. Shortly before failure of the coating 30, it is believed that the resistance spikes (e.g., the rate of change of resistance drastically increases). It is believe that such a spike may be identified within 48 hours before catastrophic failure of the coating 30. When the spike occurs and/or can be identified a substantial period of time prior to failure (e.g., from 1 hour to 48 hours before failure), maintenance may be performed on the transparency or the transparency may be replaced to avoid an emergency situation caused by such catastrophic failures. When the spike occurs and/or is identified closer to failure of the conductive coating 30 (e.g., from 1 minute to 1 hour before anticipated failure) there may not be sufficient time to repair or replace the transparency. In that case, corrective action can be taken, such as ceasing to apply electric current to the conductive coating 30, to reduce or prevent further damage to the coating 30 to avoid or delay failure of the coating 30 and/or transparency. For automated systems, the applied current can be automatically stopped to delay or prevent failure of the conductive coating 30 even when the spike is identified less than 1 minute before anticipated failure of the coating 30.

Failure of the coating 30 can refer to an occurrence of a substantial arcing event. Arcing can occur when electrical charge accumulates within the coating 30 and/or within other portions of the transparency. The accumulation of electrical charge may occur when a gas and/or insulating material between electrodes, such as the bus bars, begins to breakdown. When the accumulated electric current eventually discharges from the coating 30 or transparency, an electrical arc is produced which can appear to promulgate across the surface of the coating 30. In extreme cases, such arcing events can cause the conductive coating 30 and/or transparency to crack due to thermal shock caused by the arcing event. Cracking of the transparency can occur as follows. In most cases, an arcing will propagate across the conductive coating 30 and then stop due to structural characteristics of the coating 30, such as a change in coating thickness. The stop creates a concentration of energy, which creates a hot spot. Such "hot spots" create large thermal stresses because of the temperature difference between the hot spots and the surrounding portions of the coating 30 and/or transparency. Such stresses ultimately lead to breakage of the transparency. Even if the transparency does not crack, arcing events can be distracting for vehicle operators.

As used herein, a "substantial arcing event" can refer to arcing that is noticeable to a vehicle operator and/or which produces a thermal shock that increases a localized temperature of the coating 30 by an acceptable limits. As will be appreciated by those skilled in the art, it is desirable to replace the transparency before the substantial arcing event occurs. Minor arcings can occur during normal use of the conductive coating 30. Minor arcings can refer to arcings that are not visible to vehicle operators and/or which do not create hot spots in the conductive coating. The transparency generally does not need to be repaired or replaced to avoid such minor arcings.

The present disclosure is also directed to systems 200 for providing information to users (e.g., vehicle operators, pilots, maintenance personnel, scheduling systems, and/or vehicle owners) about a condition of the coating 30 and about an estimated remaining usable life of the coating 30. More specifically, the systems 200 and methods of the present disclosure are intended to provide users with the following types of information and/or to perform the following functions.

First, during normal operation of the aircraft, the user may be provided with periodic updates related to an estimated remaining usable life of the transparency. The update may be provided as a numeric value representing a remaining number of flight hours, heating cycles, days, weeks, or months until expected failure of the coating and/or transparency.

Second, the systems 200 and methods disclosed herein may provide a user with an alarm or alert indicating that expected failure is imminent. Such an alert may be provided when the spike in resistance of the conductive coating 30 is identified. As discussed previously, the spike may be identified from 1 minute to 48 hours before failure occurs. Alternatively or in addition to providing the alarm or alert of expected failure, the system 200 may automatically take corrective action to protect the coating 30, transparency, and/or electronic components of the aircraft. As described in detail herein, the system 200 can be configured to automatically cut off flow of electric current to the coating 30 or isolate electronic components of the aircraft from the coating 30 when the spike in resistance is identified. Electric current can be cut off either directly (e.g., by shutting off power from the power supply to the transparency) or indirectly (e.g., by electrically opening an electrical connection from temperature sensors on the transparency to the power supply, which forces the power supply and/or a heater controller to shut down power).

Third, the systems 200 and methods described herein can provide a warning to a user when the coating 30 and/or transparency has failed and/or is in the process of failing. Such sudden failure may occur as a result of a sudden damaging event (e.g., when an object, such as a rock or bird, hits the transparency causing the coating 30 and/or transparency panels to crack). Such sudden failure may also occur as a result of thermal shock caused by arcing. The warning may include instructions to remove the aircraft from service until the transparency can be replaced, to land the aircraft as quickly as possible, or to take other appropriate corrective action based on the indication that the transparency may crack or begin to break within a short period of time. As discussed previously, the corrective action can include turning off power to the transparency, which can preserve at least the outer ply of the transparency until the aircraft lands. Once the aircraft lands, a warning can issue indicating that the transparency should be replaced before the aircraft is used again.

Transparency and Conductive Coating

Figure 1:
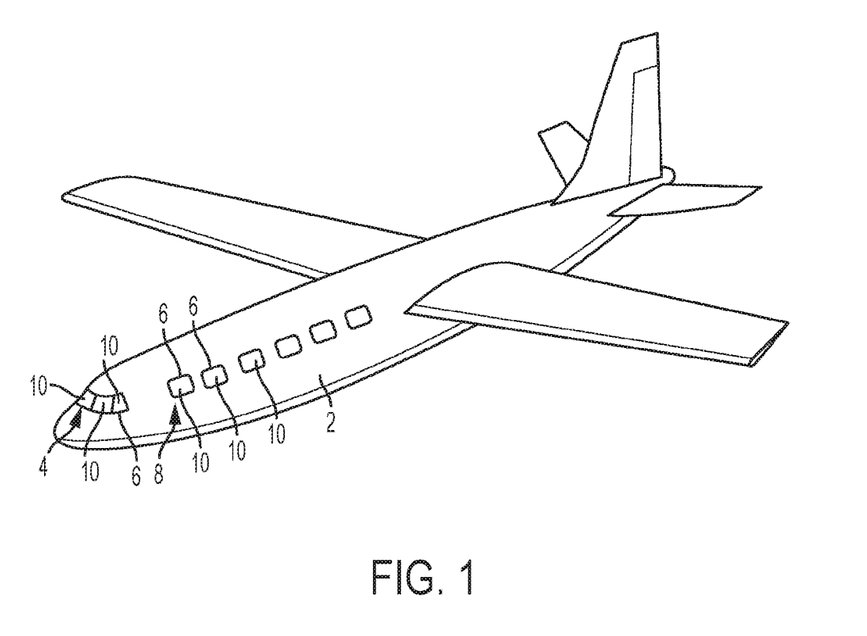
FIG. 1 is a schematic drawing of an aircraft including a windshield and passenger windows including a conductive coating and a system for monitoring a condition of the conductive coating.

With specific reference to FIG. 1, an exemplary winged aircraft 2, which can include the heating system 100 and monitoring system 200 of the present disclosure, includes a windshield 4 positioned adjacent the fore or front end of the aircraft 2. The windshield 4 desirably has a form that conforms to the shape of the corresponding aircraft 2 where the windshield 4 is installed. To facilitate attachment to the aircraft 2, each windshield 4 includes a support frame 6 that surrounds the windshield 4 and provides a mechanical interface between the windshield 4 and the body of the aircraft 2. The aircraft 2 also includes a plurality of passenger windows 8 arranged side by side extending along the fuselage of the aircraft 2. The passenger windows 8 may also include frames 6 for mounting the windows 8 to the body of the aircraft 2. As described herein, the windshield 4 and/or passenger windows 8 can include a conductive coating, such as a heater film and/or p-static layer, covering at least a portion of a surface of the window 8 or windshield 4.

The windshield 4 and/or windows 8 shown in FIG. 1 can include transparencies 10 connected to the frame 6. The transparencies 10 described herein can also be used as windows for other applications including windows for other types of vehicles, such as land vehicles (e.g., trucks, busses, trains, or automobiles) or water vehicles (e.g., ships or submarines). The transparencies 10 described herein can also be used for forming windows for buildings, such as residential buildings or commercial buildings.

Figure 2A:
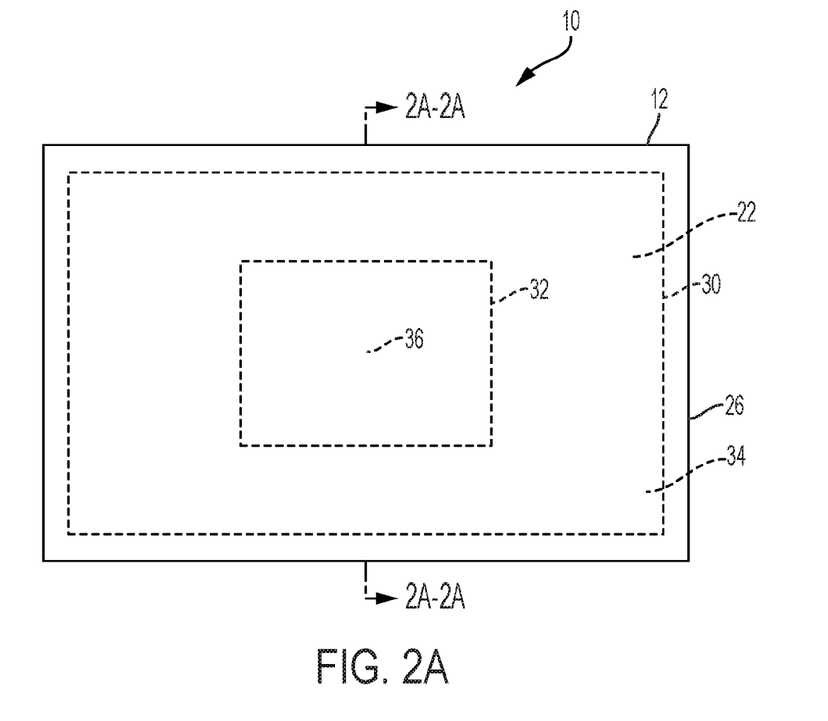
FIG. 2A is a top view of a transparency including a conductive coating to be used with a system for monitoring a condition of the coating.
Figure 2B:
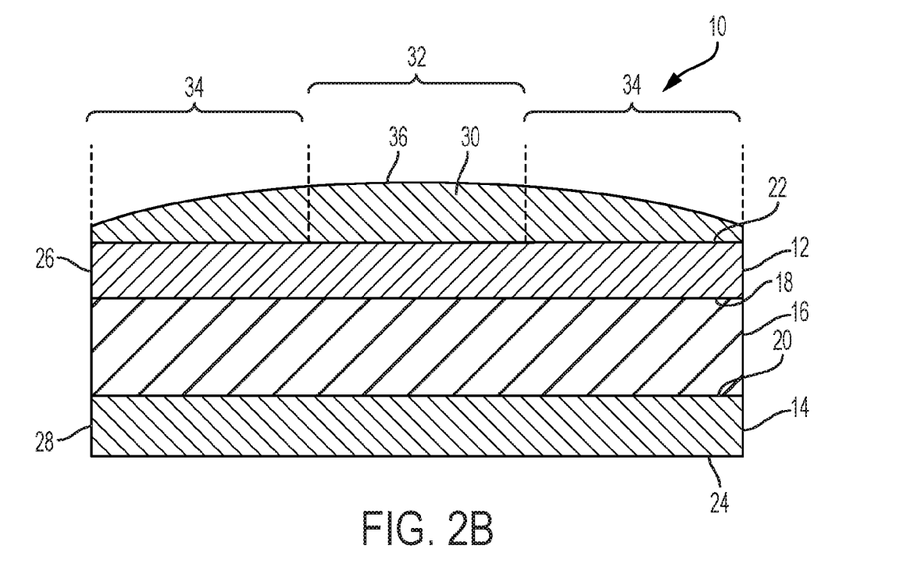
FIG. 2B is a cross-sectional view of the transparency of FIG. 2A taken along line 2A-2A.

A transparency 10 including features of the present disclosure is shown in FIGS. 2A and 2B. The transparency 10 shown in FIGS. 2A and 2B is two-ply transparency including two laminated sheets connected together along a major surface of the sheets. The transparency 10 can also include more than two plies. A three-ply transparency including a conductive coating that can be monitored by the resistance monitoring systems 200 of the present disclosure is shown and described in FIG. 2 and at column 5, line 18 to column 6, line 2 of U.S. Pat. No. 10,063,047, which is incorporated by reference.

The two-ply transparency 10 shown in FIGS. 2A and 2B includes a first sheet 12, a second sheet 14, and an interlayer 16 between the sheets 12, 14. The sheets 12, 14 include a first or inner surface 18, 20, an opposing second or outer surface 22, 24, and a peripheral edge 26, 28 extending therebetween. The first sheet 12 and the second sheet 14 can be formed from plastic materials, such as polycarbonates, polyurethanes (including OPTICOR™ manufactured by PPG Industries Ohio, Inc.), polyacrylates, polyalkylmethacrylates, stretched acrylic, or polyalkylterephthalates, such as polyethyleneterephthalate (PET), polypropyleneterephthalates, and/or polybutyleneterephthalates. The sheets 12, 14 can be formed from glass materials, such as conventional soda-lime-silicate glass (the glass can be annealed, heat-treated, thermally tempered, or chemically tempered glass). The sheets 12, 14 can also be formed from combinations of plastic and glass materials. The interlayer 16 can be formed from a softer plastic material, such as polyvinyl butyral.

The transparency 10 also includes the conductive coating 30, which includes a center region 36, covering at least a portion of a surface 18, 20, 22, and/or 24 of one of the sheets 12, 14. The coating 30 can be a transparent conductive film or a transparent conductive mesh. The conductive coating 30 can be applied to an outer surface 22, 24 of the sheets 12, 14. The conductive coating 30 may also be applied between an inner surface 18, 20 of one of the sheets 12, 14 and the interlayer 16. The conductive coating 30 can be formed from a conductive metal oxide, such as indium tin oxide (ITO), aluminum doped zinc oxide, fluorine doped tin oxide, tin oxide, antimony doped tin oxide, and others. The conductive coating 30 can also be formed from a conductive metal, such as gold, silver, antimony, palladium, platinum, and others. The conductive coating 30 can include one or more metal oxides, one or more doped metal oxides, one or more reflective layers including a noble metal, or a coating having a plurality of dielectric layers and at least one metallic layer.

The conductive coating 30 can be applied to at least one of the surfaces 18, 20, 22, and/or 24 of the sheet 12, 14 to provide targeted heating for selected portions of the sheet 12, 14. The conductive coating 30 can be configured to heat selected regions of the transparency 10 to a higher temperature than other regions of the transparency 10. In particular, the coating 30 may be configured such that portions of the sheet 12, 14 which are more likely to fog or where moisture or ice are most likely to form, such as portions 34 around the periphery of the coating 30, can be warmed to a higher temperature than other portions of the transparency 10. Portions of the sheets 12, 14 which are less susceptible to fogging or icing, such a central portion 32 of the coating 30, can be configured to be heated to a lower temperature.

Window Heating System

Figure 3:
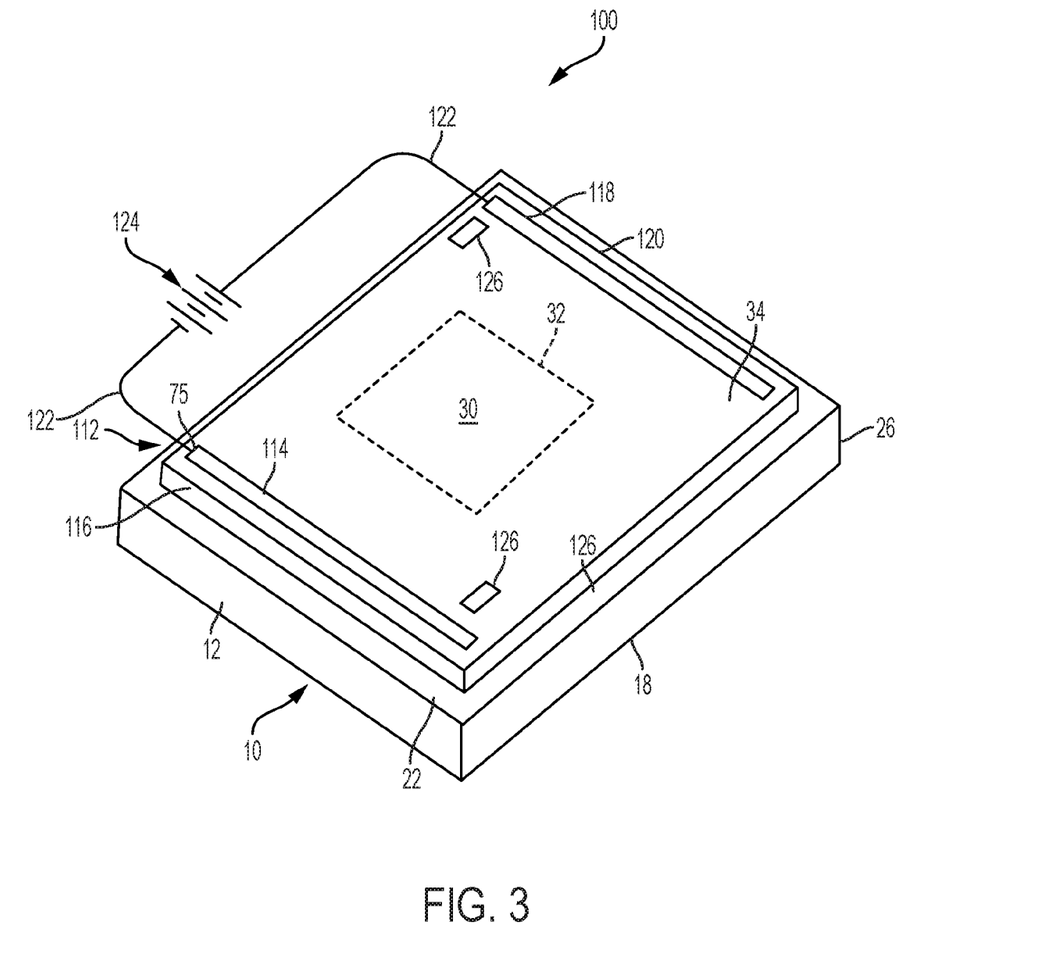
FIG. 3 is a schematic drawing of heating systems for the transparency and conductive coating of FIGS. 2A and 2B.
Figure 4:
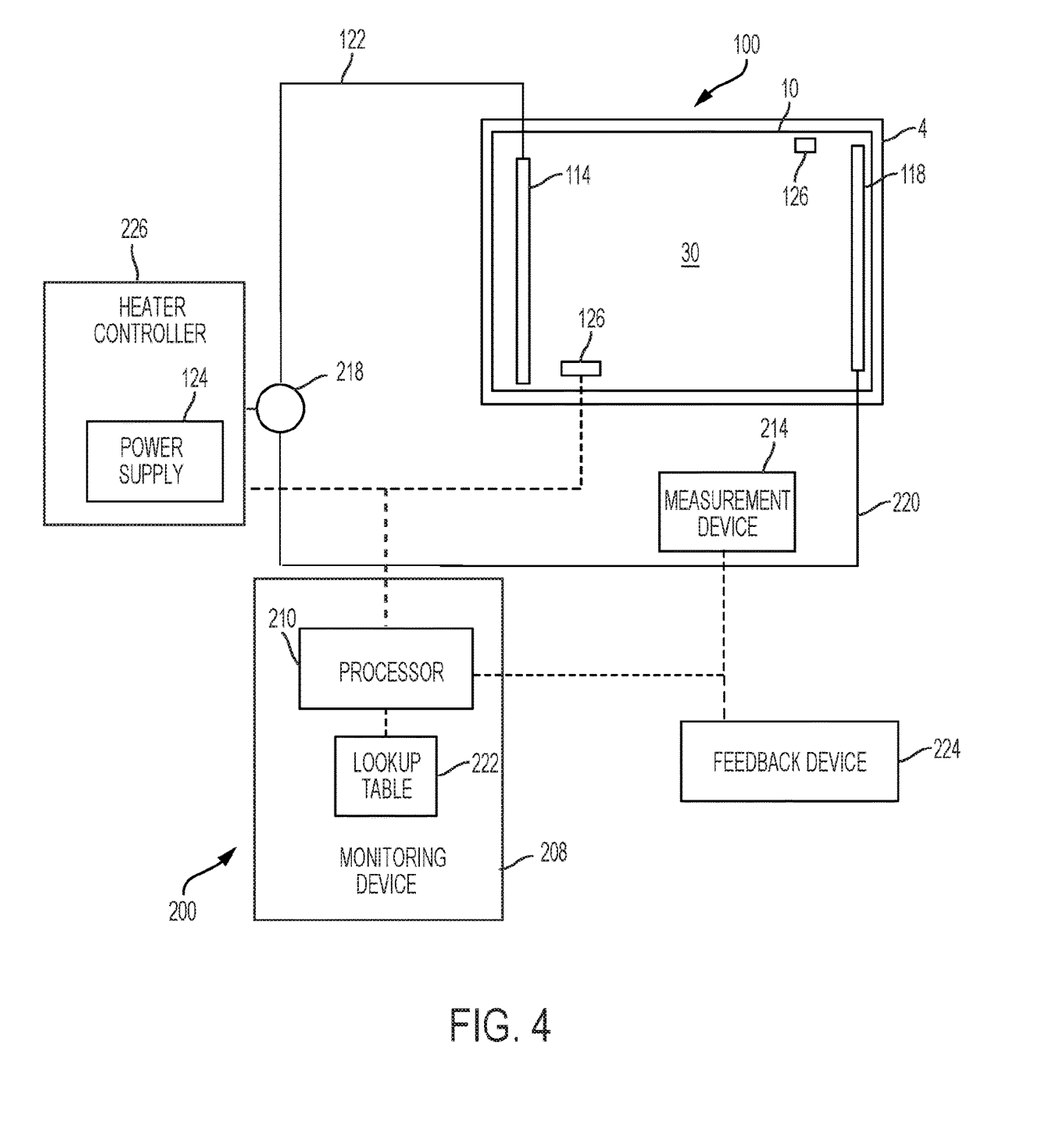
FIG. 4 is a schematic drawing of a monitoring system for the transparency and conductive coating of FIGS. 2A and 2B.

With reference to FIGS. 3 and 4, the transparencies 10 described herein can be used with a window heating system 100 for controlling flow of electric current through the conductive coating 30 of the transparency 10. The window heating system 100 includes the transparency 10 and conductive coating 30 as described in connection with FIGS. 2A and 2B. The system 100 also includes a conductive bus bar system 112 including a first bus bar 114 positioned along a first edge 116 of the sheet 12 and a second bus bar 118 positioned along an opposing edge 120 of the sheet 12. As is known in the art, the bus bars 114, 118 can be positioned on top of the conductive coating 30 or film and can be electrically connected to the coating 30 or film by a conductive adhesive or conductive tape, as are known in the art. Bus bars 114, 118 can also be positioned under the conductive coating 30, such as between the outermost surface 22 of the sheet 12 and the conductive coating 30. The conductive coating 30 can also be positioned on an inwardly facing surface 18, 20 of a sheet 12, 14 to protect the coating 30.

The system 100 can also include leads 122, such as wire leads, connected to and extending from the bus bars 114, 118 by solder, conductive tape, or other known conductive adhesives. The leads 122 can extend from the bus bars 114, 118 to a heater controller 226 (shown in FIG. 4) comprising a power supply 124. The power supply 124 can be configured to provide an electric current to the conductive coating 30 to heat the conductive coating 30. The heater controller 226 and/or power supply 124 can be configured to receive information from temperature sensors 126 positioned on the transparency 10. The temperature sensors 126 can be installed in the transparency 10, such as between the sheets 12, 14 of the transparency 10, and connected to a heater controller or power supply 124 by leads or wires extending from the transparency 10. The temperature sensors 126 can also be external to the transparency 10, such as positioned between the transparency 10 and a frame of the aircraft. When a measured temperature of the transparency 10 and/or on a surface of the transparency 10 exceeds a predetermined value, the power supply 124 and/or heater controller 226 can be configured to stop applying electric current to the bus bars 114, 118 and conductive coating 30. In a similar manner, as described in further detail with the monitoring system 200, the system 100 can be configured to disconnect the conductive coating 30 from the power supply 124 to protect the conductive coating 30 and/or power supply 124. Particularly, the power supply 124 may be disconnected from the conductive coating 30 when arcing is imminent or has occurred.

Monitoring System or an Article and/or Conductive Coating

Having described various transparencies and window heating systems 100, systems 200 for monitoring a condition of the conductive coating 30 and, in particular, for identifying changes in resistance of the coating 30 as an indicator of a condition of the coating 30 and the transparency 10 will now be described.

With specific reference to FIG. 4, the system 200 for monitoring the condition of the coating 30 includes a monitoring device 208 comprising a processor 210 for processing information received from the transparency 10 and heating system 100. The monitoring device 208 can be a dedicated or general purpose computing device adapted to communicate with existing electrical systems of the aircraft. The monitoring device 208 can be a computer server, tablet, laptop, smart phone, or any other general purpose computing device. The monitoring device 208 can be positioned in proximity to the transparency 10 or at any other location within or external to the aircraft. The monitoring device 208 can be an independent electronic device for processing data related to resistance of the conductive coating 30. The monitoring device 208 can also be integrated with other electrical systems of the aircraft, such as the heater controller 226 or other electrical systems. The monitoring device 208 may also be an external computer server, such as a server at a vehicle maintenance facility, configured to receive and process data from multiple aircrafts serviced by the facility to monitor the condition of and schedule maintenance tasks for the multiple aircrafts.

The processor 210 of the monitoring device 208 is electrically connected to the heater controller 226 and can be configured to provide instructions to the heater controller 226 and/or power supply 124 for controlling the electric current applied to the conductive coating 30. As discussed previously, the heater controller 226 can be configured to turn off the power supply 124 when a temperature of the conductive coating 30 measured by the temperature sensor 126 is above a predetermined value. In order to cease applying electric current to the conductive coating 30, the heater controller 226 can be configured to open a switch 218 positioned on a lead 122 extending between the power supply 124 and the bus bar 114. When a measured temperature is below the predetermined value, the heater controller 226 can be configured to transition the switch 218 to a closed position, in which an electrical connection between the power supply 124 and the conductive coating 30 is established.

The processor 210 of the monitoring device 208 can also be electrically connected to a measurement device 214 for sensing or measuring electrical properties of the conductive coating 30. The electrical properties measured by the measurement device 214 can include resistance of the conductive coating 30, current flow through the coating 30, and/or voltage drop of the conductive coating 30. The measurement device 214 can be a sensor connected to the coating 30 and/or to leads 122, 220 extending from the coating 30 for measuring electrical signals passing through the coating 30 and/or leads 122. The measurement device 214 may be an ammeter (e.g., a device for measuring electric current), as is known in the art, configured to measure a current passing through the coating 30. As is known in the art, an ammeter connected to an alternating current (AC) circuit can be configured to measure a root-mean-square (RMS) value for current passing through the circuit. The measurement device 214 can be configured to determine the electrical resistance of the coating 30 based on the measured electric current. The measurement device 214 can directly measure resistance of a signal passing from the conductive coating by an inductive transformer method. The measurement device 214 can also be a peripheral device, such as a handheld electronic scanner, configured to provide an electric current to the conductive coating 30 and to measure a responsive signal from the conductive coating 30. The measurement device 214 can be configured to process the responsive signal to determine the electrical properties of the coating 30.

The measurement device 214 can be configured to periodically or continually sense or determine the electrical properties of the conductive coating 30 and to provide the sensed electrical properties to the processor 210. The processor 210 can be configured to determine or estimate a resistance of the conductive coating 30 based on the received electrical properties. Resistance refers to a measure of the difficulty of passing an electric current through a conductor. As discussed previously, deterioration of the coating 30 from prolonged use or from sudden damaging events causes resistance of the conductive coating 30 to increase. In particular, the processor 210 can be configured to identify drastic increases or spikes in resistance, which can indicate that failure of the transparency 10 is immanent or has occurred.

Having generally described components of the monitoring system 200, processes for determining resistance of the conductive coating 30, which can be performed by the processor 210 will now be described.

When processing the electrical properties of the coating 30, the processor 210 can be configured to account for variations in temperature of the coating 30. Changes in temperature of the coating 30 can cause substantial changes in resistance of the coating 30, even when the coating 30 is not damaged. Such changes in resistance caused by changes in temperature may appear as a spike in resistance and lead to false positive alarms or unnecessarily low estimates for remaining usable life of the coating 30.

While not intending to be bound by theory, it is believed that resistance of a coating 30 formed from ITO can change from 1% to 7% due to extreme temperature variations. Experiments conducted by the inventors have demonstrated that an "extreme temperature variation" (e.g., increasing a temperature of a coating from −40° F. to +130° F.) increases the resistance of the coating 30 by 6% to 7%.

In order to account for changes in temperature of the coating 30, a threshold for determining when the coating 30 is near failure can be any detected change in resistance of greater than 10% over a short period of time, without considering a temperature of the coating 30. The "short period of time" can be 24 hours or less. The system 200 can be configured to attribute changes of resistance of less than 10% to thermal variations in the coating 30, such as thermal variations caused by periods of time between heating cycles, and not to degradation of the coating 30. Using a threshold value for change of resistance of at least 10% over the short period of time takes into account both the 6% to 7% change in resistance, which can be caused by extreme changes in temperature of the coating 30, as well as a 3% to 4% safety factor to avoid a false positive response or alarm.

Another method for accounting for changes in temperature of the coating 30 uses experimentally derived or calculated values to estimate what portion of a measured change in resistance is due to the change in temperature. In particular, experimental measurements may be obtained for a conductive coating 30 showing a change in resistance of the coating 30 due to changes in ambient temperature. The experimental values may be stored on system memory associated with the processor 210. The processor 210 can be configured to determine a change in temperature of the coating 30 from data sensed by the temperature sensors 126. The processor 210 can then determine an expected resistance change due to the measured temperature variations based on the measured temperature values and the experimental data stored on the system memory. When analyzing resistance change data for the coating 30, the processor 210 can filter out the "expected resistance change" caused by the temperature variations. Any remaining change in resistance after the "expected resistance change" is filtered out is assumed to be due to changes in a condition of the coating 30 and not to temperature changes.

Once changes in resistance caused by thermal effects are accounted for or if temperature remains constant, then changes in resistance of the coating 30 are caused by one or more of the following. First, changes in resistance of the coating 30 and/or windshield (e.g., a substantially linear increase in resistance of the coating 30 over time) can be due to normal aging of the windshield and coating 30. In particular, while not intending to be bound by theory, it is believed that the coating 30 slowly oxidizes during years of service as moisture accumulates in the coating 30.

Second, close to an end of life of the coating 30 and/or transparency 10, oxidation of the coating 30 starts to create micro-arcings (e.g., arcings that are not visible to the vehicle operator). The micro-arcings cause a change in the resistance of the coating 30 (e.g., an identifiable non-linear spike in resistance of the coating 30) a few hours before a substantial arcing event occurs or before a major defect is detected.

Third, upon occurrence of a major defect, resistance increases substantially indicating failure of the coating 30 and/or transparency 10. For defects caused by accumulated effects of micro-arcings, this resistance change can be low (e.g., 10% to 20% compared to an average resistance of the coating 30 for a period of time prior to failure). For major defects caused by damage from sudden impacts to the coating 30 and/or transparency 10, the change in resistance can be 30% to 40% or greater compared to the average resistance of the coating 30. When a spike in resistance is detected, the processor 210 can be configured to determine whether the spike in resistance coincided with a spike in temperature of the coating 30. If no spike in temperature is detected, the processor 210 may emit an alarm for even small detected changes in resistance (e.g., a change in resistance of from 1% to 5% compared to an average value or resistance of the coating 30). However, when a spike in temperature is detected, the threshold for emitting an alarm can be a change in resistance of 10% of more. In a similar manner, the processor 210 may be configured to emit an alarm when a determined or measured resistance of the coating 30 remains constant or rises slowly (e.g., by less than 1%) while a temperature of the coating 30 continues to drop, as may occur when the system 200 turns off a flow of electric current from the power supply 124 to the coating 30.

In addition to identifying spikes in resistance, the processor 210 can also be configured to determine an estimated remaining usable life of the conductive coating 30 and transparency 10. As described previously, the estimated remaining usable life can refer to an estimated period of time before failure of the coating 30 or transparency 10 occurs. Estimated remaining usable life can also refer to an estimated period of time before the risk of failure exceeds user comfort levels. In order to calculate the estimated remaining usable life, the processor 210 may be configured to compare a determined or measured resistance value to a baseline or expected resistance value for the coating 30. In the case of a heating system 100 for providing alternating current (AC) to the coating 30, the determined or measured resistance can refer to a root-mean-square (RMS) value for electric current passing through the coating 30 over a predetermined period of time. A baseline value can refer to a resistance of the coating 30 at the time of manufacture of the transparency 10 and windshield 4, or immediately after the transparency 10 is installed in the aircraft 2. An expected resistance value can refer to a value for resistance calculated based on the initial or baseline resistance value and an amount of time that the coating 30 and/or transparency 10 has been in use. An algorithm for calculating expected resistance may assume that resistance of the coating 30 increases linearly over time during normal operation of the coating 30 and aircraft 2. Accordingly, the expected resistance value may take into account both the initial resistance of the coating 30 and the gradual increase in resistance which occurs during normal operation of the coating 30 and transparency 10.

The estimated remaining usable life of the coating 30 may be based on a difference between the determined or measured resistance for the coating 30 and a calculated rolling or moving average resistance for the coating 30 for a predetermined time period or time window preceding the determined or measured resistance. The moving or rolling average resistance can be periodically or continually updated to account for the gradual increase in resistance that occurs during normal use of the coating 30. The predetermined period of time or time window may be from 6 hours to 12 hours, such as 9 hours. The processor 210 can be configured to calculate the average resistance using resistance measurements for the coating obtained at a suitable interval or sampling rate over the predetermined time period or time window. The interval between resistance measurements may be from 10 milliseconds (ms) to 1000 ms, such as from 100 ms to 500 ms. The interval can be 250 ms. While not intending to be bound by theory, it is believed that 250 ms can be a suitable interval length, since it allows for analysis of the RMS of a signal for electric current to be taken over 100 waves of a 400 Hz signal. Other statistical variables derived from collected resistance data, such as variance or standard deviation of resistance over time, may also be used for determining the estimated remaining usable life of the coating 30.

Due to limited data storage capabilities, it may not be possible to maintain a constant log of resistance values for the entire time period or time window (e.g., for the entire 9 hours preceding the determined or measured resistance). In that case, an infinite impulse response (IIR) filter or weighting function may be used to update the moving average for each newly obtained resistance measurement. Using an IIR filter or weighting function, each new data point influences the rolling average value by a small predetermined amount. Therefore, the processor 210 does not need to maintain a log of each determined or measured resistance value for the entire 9 hour period. Instead, the updated average resistance value is calculated based on the most recent resistance measurement and the previously calculated average.

Once the baseline or average resistance value is calculated or determined, the determined or measured resistance value can be compared to the baseline or moving average resistance value to draw conclusions about the estimated remaining usable life of the conductive coating 30 and/or transparency 10. An estimated remaining usable life may be obtained from a lookup table 222, which provides the usable life value based on the calculated difference between the determined or measured resistance and the average (or expected) resistance. Lookup table entries can be determined using modeling algorithms or based on experimentally derived data obtained using data collection and processing techniques, as are known in the art. Algorithms may be derived based on computer modeling or experimentally derived data for calculating the estimated remaining usable life based on the calculated difference between the measured current and average or baseline current.

As described previously, estimated remaining usable life can refer to an estimated amount of time during which the coating 30 or transparency 10 and associated electronics will remain in safe working order under normal use conditions. Estimated remaining usable life can also refer to an amount of time until expected failure of the coating 30 or transparency 10. Generally, the estimated remaining usable life will not account for occurrences of certain, sudden, damaging events, such as sudden impacts to the coating or windshield, which may drastically shorten the lifespan of the coating 30 or transparency 10. However, as described herein, the system 200 can be configured to provide a warning to a user when a sudden event, such as an impact, causes the coating to crack or fail.

Information about the estimated remaining usable life can be used to schedule maintenance for the aircraft 2 and windshield 4. Maintenance personnel can plan to replace a windshield 4 several days or weeks before the estimated remaining usable life expires. A determination of the estimated remaining usable life of the windshield 4 can also be used to provide alerts or alarms to a user when the windshield is near failure. The system 200 can be configured to provide an alert to the user when a spike in the determined or measured resistance of the coating 30 indicates that the coating 30 or transparency 10 is expected to fail within a specified time period, such as 48 hours. By providing the specified time period, vehicle operators and maintenance personnel will have sufficient time to correct any identified problems with the coating 30 and/or to replace the windshield 4 before catastrophic failure of the coating 30 occurs. In a similar manner, the system 200 can be configured to provide an alert to a user when the estimated remaining usable life substantially changes within a short period of time (e.g., a period of less than 24 hours), as such a substantial change may indicate that the windshield 30 has suffered a damaging event, such as an impact or thermal shock caused by arcing.

Once the estimated remaining usable life is determined, the processor 210 can be configured to provide feedback about the estimated remaining usable life to a user (e.g., a vehicle operator, maintenance technician, or owner). The system 200 can include a feedback device 224, such as a visual display, which displays the estimated remaining usable life. The feedback device 224 can be an element of an aircraft control system and can be located on an aircraft control panel. The feedback device 224 can be a separate computer device, such as a laptop computer, portable computer device, computer tablet, smart phone, or similar portable computer device in wired or wireless communication with the monitor device 208 and processor 210. The feedback device 224 can also be a device, such as a computer server or database system, which is remote from the vehicle and connected to the aircraft by a long-range wired or wireless data communications interface.

The estimated remaining usable life can be displayed to the user as a numeric value, such as a numeric value indicating a number of flight minutes, hours, or days of usable life remaining (e.g., until failure of the coating 30 or transparency 10). Information about estimated remaining usable life may also be provided as a graphical indicator, such as a computer generated icon of a gauge or scale displayed on a visual display screen. The feedback device 224 may display a gas gauge icon including a dial that moves towards an empty position as the estimated remaining usable life is depleted.

As described previously, the system 200 can also be configured to provide alarms or alerts to a user when the system 200 determines that failure of the coating 30 and/or transparency 10 is imminent. The processor 210 may cause the feedback device 224 to provide an alarm or alert when a spike in resistance of the coating 30 is identified. The processor 210 may also be configured to issue warnings and take corrective action when determined or measured resistance data indicates that the coating 30 and/or transparency 10 has failed or is about to fail. When imminent failure and/or an emergency situation is identified, the processor 210 may cause the feedback device 224 to provide a warning to the user. Similar warnings can also be automatically sent to other interested parties, such as air traffic control or emergency personnel.

The processor 210 can also be configured to control the heating system 100 based on the determined or measured resistance and/or estimated remaining usable life of the transparency 10. In particular, the processor 210 can be configured to provide instructions to the heater controller 226 when failure of the coating 30 is imminent or has already occurred. Based on the received instructions, the heater controller 226 can be configured to turn off the power supply 124 and/or to disconnect the power supply 124 from the conductive coating 30 by opening the switch 218 to cease applying the electric current to the conductive coating 30. The processor 210 can be configured to cause the power supply 124 to cease providing power to the conductive coating 30 when the difference between the determined or measured resistance and the calculated moving or rolling average resistance is greater than a predetermined value. The processor 210 can also cause the power supply 124 to cease applying electric current to the conductive coating 30 when the estimated remaining usable life of the coating 30 is below a predetermined value and/or when the determined or measured resistance, or a difference between the determined or measured resistance and average resistance, exceeds a predetermined value.

Figure 5:
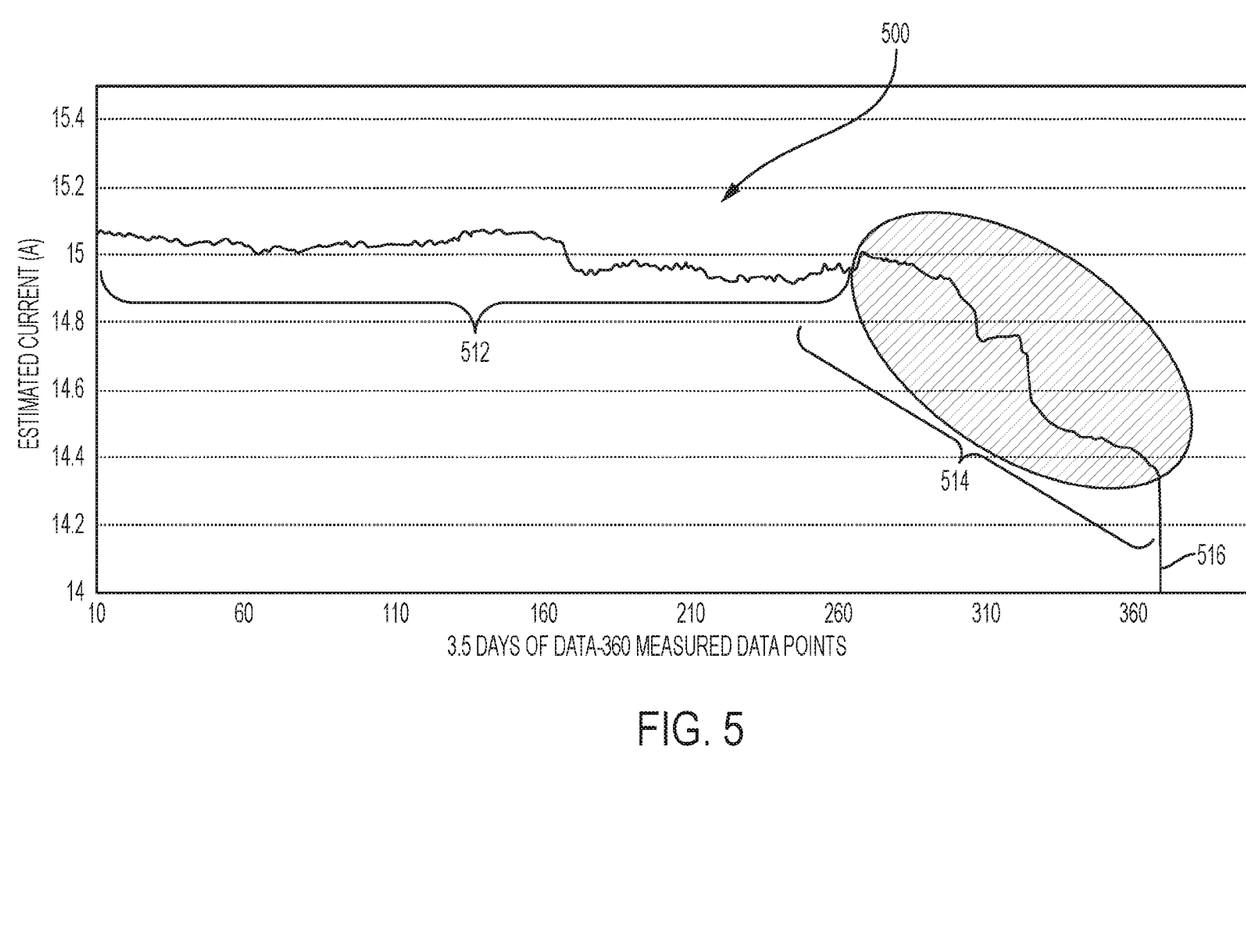
FIG. 5 is a graph showing changes in measured electric current for a conductive coating prior to failure of the coating.

As described previously, the system 200 is configured to identify spikes in resistance of the conductive coating 30, which indicate that the coating 30 and/or transparency 10 is near failure. A graph 500 showing measured current for an exemplary conductive coating 30 for a period of time prior to failure of the coating 30 is shown in FIG. 5. The graph 500 shows measured current for the coating of a windshield with a constant voltage applied for 360 current measurements (as shown on the x-axis) taken over 3.5 days prior to failure of the coating. As shown in the graph 500, current (in amperes) passing through a conductive coating 30 was measured to be 15 A±0.05 A for resistance measurements 0 to 260, as shown by the substantially flat portion 512 of the graph 500. At 8 hours (current measurements 260-360) prior to failure of the coating 30, the slope of the graph 500 beings to drastically decrease, as shown by the portion 514 of the graph 500. During portion 514, the measured current (in amperes) decreases from 15 A to 14.3 A. Breakage of the transparency and arcing of the coating occurs at resistance measurement 360, as shown by the vertical portion 516 of the graph 500. As can be appreciated by those skilled in the art, because of the constant voltage applied to the transparency 10, the change in current measured indicates a proportional change in resistance of the conductive coating 30.

Windshield Monitoring Method

Figure 6:
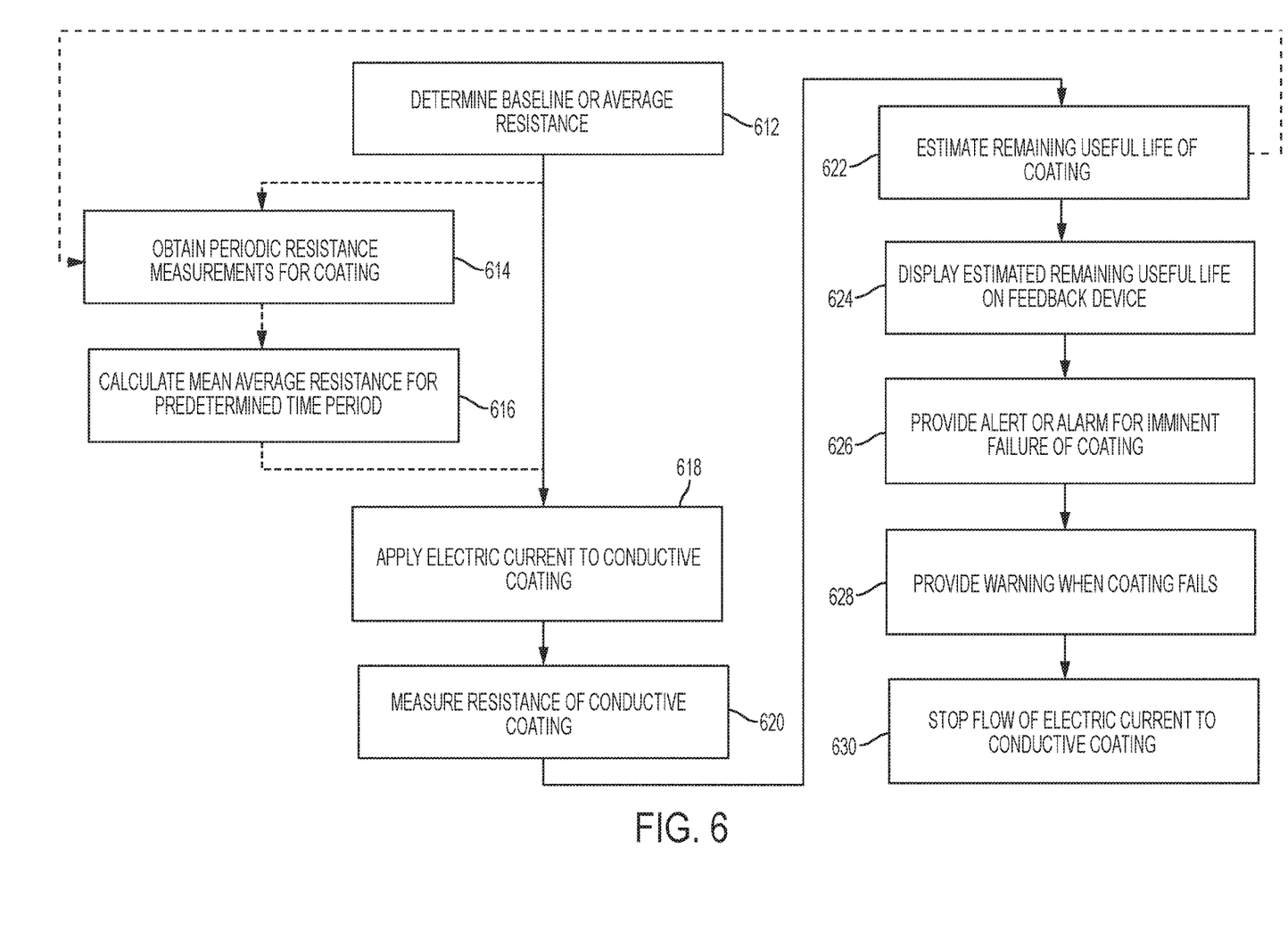
FIG. 6 is a flow chart describing a process for monitoring a condition of a transparency.

FIG. 6 is a flow chart illustrating a method for monitoring a windshield. As previously described, the windshield can be a windshield of a vehicle. The method includes determining an average or baseline resistance for the windshield, as shown at step 612. Baseline resistance may refer to an initial resistance of the windshield measured during installation. Average resistance can refer to an average resistance for the windshield calculated over a predetermined period of time. The average can be a rolling or moving average in which only measurements obtained within the predetermined period are considered for calculating the average resistance.

The average resistance can be determined by periodically measuring the resistance of the conductive coating to obtain periodic resistance measurements, as shown at step 614. Once the periodic measurements are obtained, a mean average for a predetermined number of preceding periodic resistance measurements is calculated, as shown at step 616. The rolling average can also be calculated using an IIR filter or weighting function to conserve computing resources, as described previously.

In order to determine an estimated remaining usable life of the windshield or conductive coating, the method can further include applying an electric current to the conductive coating, as shown at step 618. The electric current can be provided through a heating system, such as the system 100 shown in FIGS. 3 and 4. Electric current may also be provided by a power supply mounted to the windshield or from another source. Electric current may be supplied to the conductive coating from a portable scanner device, which wirelessly supplies the electric current to the coating via an induction device.

The method further includes, at step 620, determining or measuring a resistance of the conductive coating based on a signal received from the windshield in response to the applied electric current. The resistance of the coating may be obtained in a conventional manner using commercially available devices, such as an ammeter electrically connected between the coating and power supply. The measurement device can be configured to measure electrical properties of the coating, which can be processed and analyzed to determine the resistance of the coating. As discussed previously, when alternating current (AC) is applied to the conductive coating from the heating system, the measurement device can be configured to measure an RMS value for electric current passing through the coating. Alternatively or in addition, resistance of a signal passing from the conductive coating can be measured directly by an inductive transformer method.

Once the resistance is measured or determined, the estimated remaining usable life of the windshield can be determined based on a difference between the determined or measured resistance and the calculated baseline or average resistance for the conductive coating, as shown at step 622. The method further includes, once the estimated remaining average usable life is determined, providing information about the estimated remaining usable life to a user. As previously described, the estimated remaining usable life can be provided to a user through a feedback device. The feedback device can be an element of a vehicle control or operating system. The feedback device can be a separate electronic or computer device. The feedback device can be remote from the aircraft. In that case, the aircraft can include a communications interface, such as a wireless transmitter, for sending information about the estimated remaining usable life of the coating and/or windshield to remote locations. Information about an estimated remaining usable life of a windshield may also be sent to a centralized maintenance facility or to another facility responsible for monitoring and scheduling times for replacing windshields and/or other components of vehicles. The condition of the windshield can continue to be periodically monitored over the lifetime of the windshield. When conditions leading to windshield failure are identified, information about such conditions can also be transmitted to the feedback device.

As described above, feedback about the estimated remaining usable life of the coating and/or transparency can be provided in different ways based on how long until expected failure occurs. When the resistance of the coating increases gradually and no spikes are identified, the feedback device may only provide a numeric value for the remaining usable life, as shown at step 624. In that case, the system continues to monitor the resistance of the coating and updates the estimated remaining usable life at appropriate predetermined intervals. When a spike in resistance of the coating is identified, as shown at step 626, the feedback device may provide an alarm or alert informing the user that failure is imminent (e.g., that the coating or transparency may fail within 1 minute to 48 hours). Similar alerts can also be sent to other interested parties using communications circuitry and/or transmitters associated with the feedback device, monitoring system, or aircraft. The system continues to monitor the coating until failure. When failure of the coating or transparency is identified, as shown at step 628, the system causes the feedback device to provide warning information to the user that failure has occurred and/or is occurring. When failure is identified, the processor and/or heater controller may also take other corrective actions such as turning off power from the power supply or opening a switch between the power supply and conductive coating, as shown at step 630, to prevent further damage to the coating or transparency.

Whereas particular embodiments of this invention have been described above for purposes of illustration, it will be evident to those skilled in the art that numerous variations of the details of the present invention may be made without departing from the invention as defined in the appended claims.

In view of the foregoing description, the present invention thus relates inter alia to the subject matter of the following clauses though being not limited thereto.

Clause 1: A system for monitoring a condition of an article comprising a conductive coating, the system comprising: a measurement device electrically connectable to the conductive coating of the article configured to sense an electrical property of the conductive coating; and a processor electrically connected to the measurement device, the processor being configured to: receive the sensed electrical property of the conductive coating from the measurement device; determine a resistance of the conductive coating based on the received sensed electrical property; determine an estimated remaining usable life of the article based on the determined resistance of the conductive coating; and generate an output signal representative of the determined estimated remaining usable life.

Clause 2: The system of clause 1, wherein the electrical property of the conductive coating comprises resistance of the coating, current flow through the coating, and/or voltage drop of the conductive coating.

Clause 3: The system of clause 1 or clause 2, wherein the estimated remaining usable life of the article comprises an estimated time until substantial degradation of the conductive coating occurs.

Clause 4: The system of any of clauses 1-3, further comprising a feedback device configured to receive the generated output signal representative of the estimated remaining usable life from the processor and provide an alert to a user indicating that maintenance of the article is required when the estimated remaining usable life is below a predetermined value.

Clause 5: The system of any of clauses 1-4, further comprising a feedback device configured to receive the generated output signal representative of the estimated remaining usable life from the processor and provide an alert indicating a possibility of failure of the article within a period of time determined based on the estimated remaining usable life.

Clause 6: The system of any of clauses 1-5, wherein the processor is configured to determine the estimated remaining usable life of the coated article based on a difference between the determined resistance and a threshold resistance.

Clause 7: The system of any of clauses 1-6, wherein the processor is configured to determine the estimated remaining usable life of the coated article based on a difference between the determined resistance and a calculated average resistance for the conductive coating.

Clause 8: The system of any of clauses 1-7, wherein the processor is configured to determine the estimated remaining usable life based on a rate of change of the determined resistance of the conducive coating.

Clause 9: The system of any of clauses 1-8, wherein the estimated remaining usable life is based on a difference between a rate of change of the determined resistance of the conducive coating over a plurality of preceding time intervals and a rate of change of the determined resistance over a single immediately preceding time interval of the plurality of time intervals.

Clause 10: The system of any of clauses 1-9, further comprising a power supply electrically connectable to the conductive coating for providing an electric current to the conductive coating to heat the conductive coating.

Clause 11: The system of clause 10, wherein the signal generated by the processor causes the power supply to cease applying the electric current to the conductive coating when the estimated remaining usable life of the conductive coating is less than a predetermined value.

Clause 12: The system of any of clauses 1-11, further comprising a temperature sensor configured to measure a temperature of the conductive coating, wherein the processor is configured to receive the measured temperature from the temperature sensor and modify the determined resistance of the conductive coating based on the measured temperature, to account for effects of changes in temperature on resistance of the conductive coating.

Clause 13: A windshield heating system for a vehicle, comprising: a transparency; a conductive coating on a portion of the transparency configured to generate heat when an electric current is applied to the conductive coating; a power supply connected to the conductive coating configured to generate the electric current that heats the conductive coating; a measurement device electrically connectable to the conductive coating configured to sense an electrical property of the conductive coating when the electric current is applied to the conductive coating; and a processor electrically connected to the power supply and to the measurement device, the processor being configured to: cause the power supply to apply the electric current from the power supply to the conductive coating; receive the sensed electrical property of the conductive coating from the measurement device; determine a resistance of the conductive coating based on the sensed electrical property; and generate a signal to disconnect the power supply from the conductive coating based on the determined resistance of the conductive coating.

Clause 14: The system of clause 13, wherein the processor generates the signal to disconnect the power supply from the conductive coating when a difference between the determined resistance of the conductive coating and a calculated average resistance of the conductive coating exceeds a predetermined value.

Clause 15: The windshield heating system of clause 13 or clause 14, wherein the transparency comprises a first sheet, a second sheet, and an interlayer between the first sheet and the second sheet.

Clause 16: The windshield heating system of clause 15, wherein the first sheet and the second sheet comprise plastic and/or glass and the interlayer comprises plastic which is softer than the first sheet and/or the second sheet.

Clause 17: The windshield heating system of any of clauses 13-16, wherein the conductive coating comprises a metal oxide, a doped metal oxide, a reflective layer comprising a noble metal, a dielectric layer, and/or a metallic layer.

Clause 18: The windshield heating system of any of clauses 13-17, further comprising circuitry for applying the generated electric current between the power supply and the conductive coating, the circuitry comprising a bus bar electrically coupled to the conductive coating.

Clause 19: A method of monitoring a condition of a transparency, comprising: sensing an electrical property of a conductive coating of the transparency with a measurement device; determining, with a processor, a resistance of the conductive coating based on the sensed electrical property sensed by the measurement device; and determining, with a processor, an estimated remaining usable life of the transparency based on the determined resistance.

Clause 20: The method of clause 19, wherein determining the estimated remaining usable life comprises determining a difference between a rate of change of the determined resistance of the conducive coating over a plurality of preceding time intervals and a rate of change of the determined resistance over a single immediately preceding time interval of the plurality of time intervals.

The invention claimed is:

1. A system for monitoring a condition of an article comprising a conductive coating, the system comprising:
a measurement device electrically connectable to the conductive coating of the article configured to sense an electrical property of the conductive coating; and
a processor electrically connected to the measurement device, the processor being configured to:
receive the sensed electrical property of the conductive coating from the measurement device;
determine a resistance of the conductive coating based on the received sensed electrical property;
determine an estimated remaining usable life of the article based on a rate of change of the determined resistance of the conductive coating; and
generate an output signal representative of the determined estimated remaining usable life.

2. The system of claim 1, wherein the electrical property of the conductive coating comprises resistance of the coating, current flow through the coating, and/or voltage drop of the conductive coating.

3. The system of claim 1, wherein the estimated remaining usable life of the article comprises an estimated time until substantial degradation of the conductive coating occurs.

4. The system of claim 1, further comprising a feedback device configured to receive the generated output signal representative of the estimated remaining usable life from the processor and provide an alert to a user indicating that maintenance of the article is required when the estimated remaining usable life is below a predetermined value.

5. The system of claim 1, further comprising a feedback device configured to receive the generated output signal representative of the estimated remaining usable life from the processor and provide an alert indicating a possibility of failure of the article within a period of time determined based on the estimated remaining usable life.

6. The system of claim 1, wherein the processor is configured to determine the estimated remaining usable life of the coated article based on a difference between the determined resistance and a threshold resistance.

7. The system of claim 1, wherein the processor is configured to determine the estimated remaining usable life of the coated article based on a difference between the determined resistance and a calculated average resistance for the conductive coating.

8. The system of claim 1, wherein the estimated remaining usable life is based on a difference between a rate of change of the determined resistance of the conducive coating over a plurality of preceding time intervals and a rate of change of the determined resistance over a single immediately preceding time interval of the plurality of time intervals.

9. The system of claim 1, further comprising a power supply electrically connectable to the conductive coating for providing an electric current to the conductive coating to heat the conductive coating.

10. The system of claim 9, wherein the signal generated by the processor causes the power supply to cease applying the electric current to the conductive coating when the estimated remaining usable life of the conductive coating is less than a predetermined value.

11. The system of claim 1, further comprising a temperature sensor configured to measure a temperature of the conductive coating, wherein the processor is configured to receive the measured temperature from the temperature sensor and modify the determined resistance of the conductive coating based on the measured temperature, to account for effects of changes in temperature on resistance of the conductive coating.

12. A windshield heating system for a vehicle, comprising:
a transparency;
a conductive coating on a portion of the transparency configured to generate heat when an electric current is applied to the conductive coating;
a power supply connected to the conductive coating configured to generate the electric current that heats the conductive coating;
a measurement device electrically connectable to the conductive coating configured to sense an electrical property of the conductive coating when the electric current is applied to the conductive coating; and
a processor electrically connected to the power supply and to the measurement device, the processor being configured to:
cause the power supply to apply the electric current from the power supply to the conductive coating;
receive the sensed electrical property of the conductive coating from the measurement device;
determine a rate of change of resistance of the conductive coating based on the sensed electrical property; and
generate a signal to disconnect the power supply from the conductive coating based on the determined rate of change of resistance of the conductive coating.

13. The system of claim 12, wherein the processor generates the signal to disconnect the power supply from the conductive coating when a difference between the determined resistance of the conductive coating and a calculated average resistance of the conductive coating exceeds a predetermined value.

14. The windshield heating system of claim 12, wherein the transparency comprises a first sheet, a second sheet, and an interlayer between the first sheet and the second sheet.

15. The windshield heating system of claim 14, wherein the first sheet and the second sheet comprise plastic and/or glass and the interlayer comprises plastic which is softer than the first sheet and/or the second sheet.

16. The windshield heating system of claim 12, wherein the conductive coating comprises a metal oxide, a doped metal oxide, a reflective layer comprising a noble metal, a dielectric layer, and/or a metallic layer.

17. The windshield heating system of claim 12, further comprising circuitry for applying the generated electric current between the power supply and the conductive coating, the circuitry comprising a bus bar electrically coupled to the conductive coating.

18. A method of monitoring a condition of a transparency, comprising:
sensing an electrical property of a conductive coating of the transparency with a measurement device;
determining, with a processor, a rate of change of resistance of the conductive coating based on the sensed electrical property sensed by the measurement device; and
determining, with a processor, an estimated remaining usable life of the transparency based on the determined rate of change of resistance.

19. The method of claim 18, wherein determining the estimated remaining usable life comprises determining a difference between a rate of change of the determined resistance of the conducive coating over a plurality of preceding time intervals and a rate of change of the determined resistance over a single immediately preceding time interval of the plurality of time intervals.

* * * * *